United States Patent
Wand

(10) Patent No.: US 6,762,693 B2
(45) Date of Patent: Jul. 13, 2004

(54) MULTIPLE INPUT MULTIPLEXING CONNECTION APPARATUS AND METHOD

(75) Inventor: Thomas J. Wand, Wayne, MI (US)

(73) Assignee: Methode Electronics, Inc., Chicago, IL (US)

(*) Notice: Subject to any disclaimer, the term of this patent is extended or adjusted under 35 U.S.C. 154(b) by 519 days.

(21) Appl. No.: 09/931,217

(22) Filed: Aug. 16, 2001

(65) Prior Publication Data

US 2003/0034691 A1 Feb. 20, 2003

(51) Int. Cl.[7] .............................................. H02G 11/00
(52) U.S. Cl. ............................... 340/870.13; 307/10.1; 361/83
(58) Field of Search .......................... 340/870.16, 425.5, 340/527, 3.21, 870.13; 307/10.1, 38, 113, 147; 361/83, 86, 87, 91.3

(56) References Cited

U.S. PATENT DOCUMENTS 5,906,392 A * 5/1999 Reid et al. .................. 280/735
6,121,692 A * 9/2000 Michaels et al. .......... 307/10.1

* cited by examiner

Primary Examiner—Michael Horabik
Assistant Examiner—Hung Dang
(74) Attorney, Agent, or Firm—Blank Rome LLP

(57) ABSTRACT

A connection system for communicating multiple signals between a steering wheel and a steering column of a vehicle over a single wire is provided that uses time division to multiplex multiple signals. A plurality of signals are multiplexed together ranging from two to as many signals as desired. Input switches are grouped together to form a ladder multiplexer, such as a resistive multiplexer, that includes voltage and current muxing. A plurality of ladder multiplexers are joined together in a time division multiplexing scheme that operates continuously. An analog line may be added as a single channel. A marker pulse is used to signal the start of each time window to be divided for all the channels. Time division multiplexing is provided by a number of switching means.

18 Claims, 11 Drawing Sheets

MULTIPLE INPUT MULTIPLEXING CONNECTION APPARATUS AND METHOD

FIELD OF THE INVENTION

The present invention relates generally to a connection system between input devices and detector modules. More particularly, the present invention relates to a connection system between input detectors on a vehicle steering wheel and detector modules on a column side of a vehicle steering system.

BACKGROUND OF THE INVENTION

Modern vehicles are requiring more and more user-input functions. These functions include switches for cruise control, radio, tape player, compact disk player, windshield wipers, seat positioning, electric mirrors, heating, ventilation, air conditioning, and rear window defogger, just to name a few. Many of these functions are located on switch pods or in the steering wheel. Typically the input is in digital form to provide high-resolution and simplicity. Even microphones and speakers are becoming a desired feature for phone usage. Connection to and from these inputs is creating a huge demand on the design configurations to accommodate the large amount of inputs over limited connections.

Wire bundles are becoming larger to accommodate more and more circuits that are being added. Furthermore, the size of individual wires cannot decrease due to the requirements of mechanical strength and durability. Each additional circuit adds weight and cost due to the additional module interconnect components and wires. Multiplexing and communication busses have provided some relief in limiting the size increases in connection components. However, the requirements of more sensor circuits, reduced vehicle weight, reduced costs, and reduced free space for components, are adding additional pressure to maximize the number of inputs that can be handled by each connection.

A typical example of the need to maximize inputs available per connection is in the steering column wherein a ribbon tape conductor, called a clockspring for its resemblance to a wound clock spring, is used to couple steering circuits to the steering column of the vehicle. As the circuit count increases, the ribbon tape of the clockspring thickens in conventional practice to accommodate the additional circuits. Eventually, however, there will be no more room available to accommodate an ever increasing clockspring. This area is further challenged by complex suspension controls being added to new car designs, and these suspension controls must share the same location in the steering column as the clockspring in order to function properly, and needed additional space is not available.

Prior art connection methods typically include one of the following three methods of passing signals to a module. The first method uses a single wire connection for each input device. The second method uses a simplified multiplexing scheme usually incorporating analog voltage, resistance or current division means. The third method uses a communication bus, which requires a microprocessor on both ends of the conductor.

While a communication bus can handle a large number of input devices per connector, such a design requires a plurality of microprocessors which makes the system expensive to produce. Furthermore, a communication bus requires a communication chip for line drive and receive functions. A communication bus also utilizes a lot of circuit board space, which makes the system expensive to produce.

Accordingly, there is a need for multi-input communication system over a single line that is more compact and cost effective.

OBJECTS AND SUMMARY OF THE INVENTION

A first object of the present invention is to increase the number of input devices that can be accommodated over a single connection line.

A second object of the present invention is to reduce the manufacturing cost of a connection system.

A third object of the present invention is to reduce the total number of individual wires between multiple input devices and receiving modules in a connection system.

A fourth object of the present invention is to reduce the weight of a connection system.

A fifth object of the present invention is to reduce the complexity of a connection system.

A sixth object of the present invention is to avoid using any microprocessors in a connection system in order to reduce cost and size.

In that regard, the present invention provides a connection system that uses time division to multiplex multiple signals. A plurality of signals are multiplexed together ranging from two to as many signals as desired. Input switches are grouped together to form a ladder multiplexer, such as a resistive multiplexer, that includes voltage and current muxing. A plurality of ladder multiplexers are joined together in a time division multiplexing scheme that operates continuously. An analog line may be added as a single channel. A marker pulse is used to signal the start of each time window to be divided for all the channels. Time division multiplexing is provided by a number of switching means. For simplicity this inventor has used analog switches to perform these functions. In the preferred embodiment an analog switch and a multiplexer integrated circuit (IC) are used to reduce the parts count. The preferred analog switch is manufactured and sold by Motorola, Inc. of Phoenix, Calif.

DETAILED DESCRIPTION OF THE PRESENTLY PREFERRED EMBODIMENT

Figure 1:
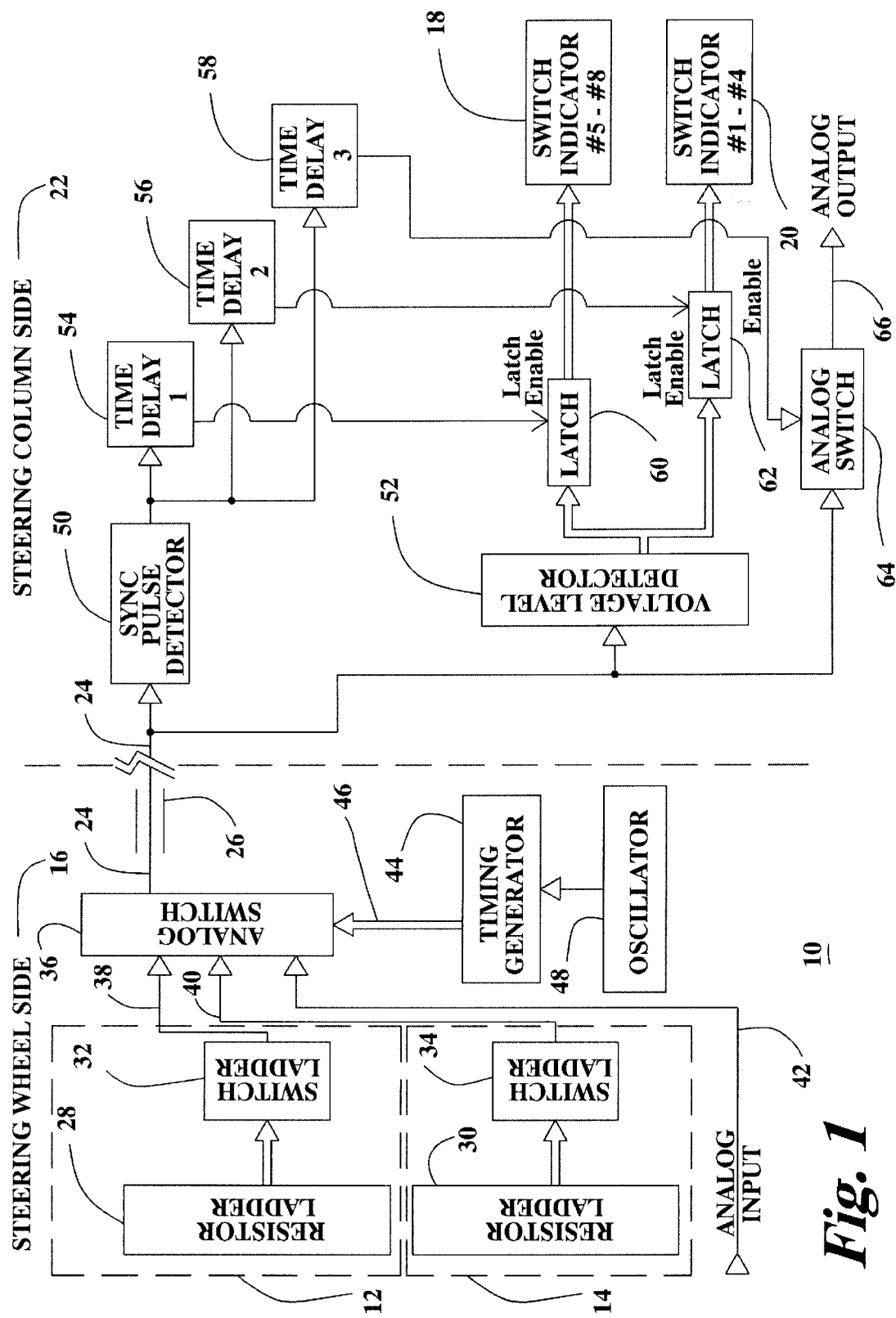
FIG. 1 is a block diagram of a connection system configured in accordance with the present invention.

Referring now to the drawings, FIG. 1 illustrates a multiplexing connection system 10 configured in accordance with the present invention. The connection system 10 enables multiple input devices 12,14 on the steering wheel side 16 of a vehicle to communicate with multiple output devices 18,20 on the steering column side 22 of a vehicle via a single wire or line 24. The single wire 24 is typically contained within a clockspring 26 on the steering column that provides an interconnection between the steering wheel side 16 and the steering column side 22 of a vehicle. The clockspring 26 is generally a flat ribbon cable that is wound around the steering column of a vehicle. The clockspring contains multiple, single wires.

In a preferred embodiment, on the steering wheel side 16 of the connection system 10, each input device 12,14 includes a resistor ladder 28,30 and a switch ladder 32,34. Each switch ladder 32,34 is connected to an analog switch 36 by a single line 38,40, respectively. A single analog input line 42 can also be connected to the analog switch 36. A timing generator 44 is connected to the analog switch 36 via multiple control lines 46. An oscillator 48 is connected to the timing generator 44. The single line 24 is outputted from the analog switch 36 to the clockspring 26 and to the steering column side 22 of the connection system 10.

On the steering column side 22, the single line 24 is received by a synchronization (sync) pulse detector 50 and a voltage level detector 52. Output of the sync pulse detector 50 is received by multiple time delay circuits 54,56,58. Outputs of time delay circuits 54,56 are connected to enables of latches 60,62. The output of the third time delay circuit 58 is connected to the enable of an analog switch 64 which, in combination with capacitor 82 (FIG. 3) forms an analog sample and hold function (latch). Outputs of the latches 60,62 are received by output modules or switch indicators 18,20, respectively. The analog switch 64 outputs analog signals on line 66. Output of the voltage level detector 52 is received by the latches 60,62.

Figure 2:
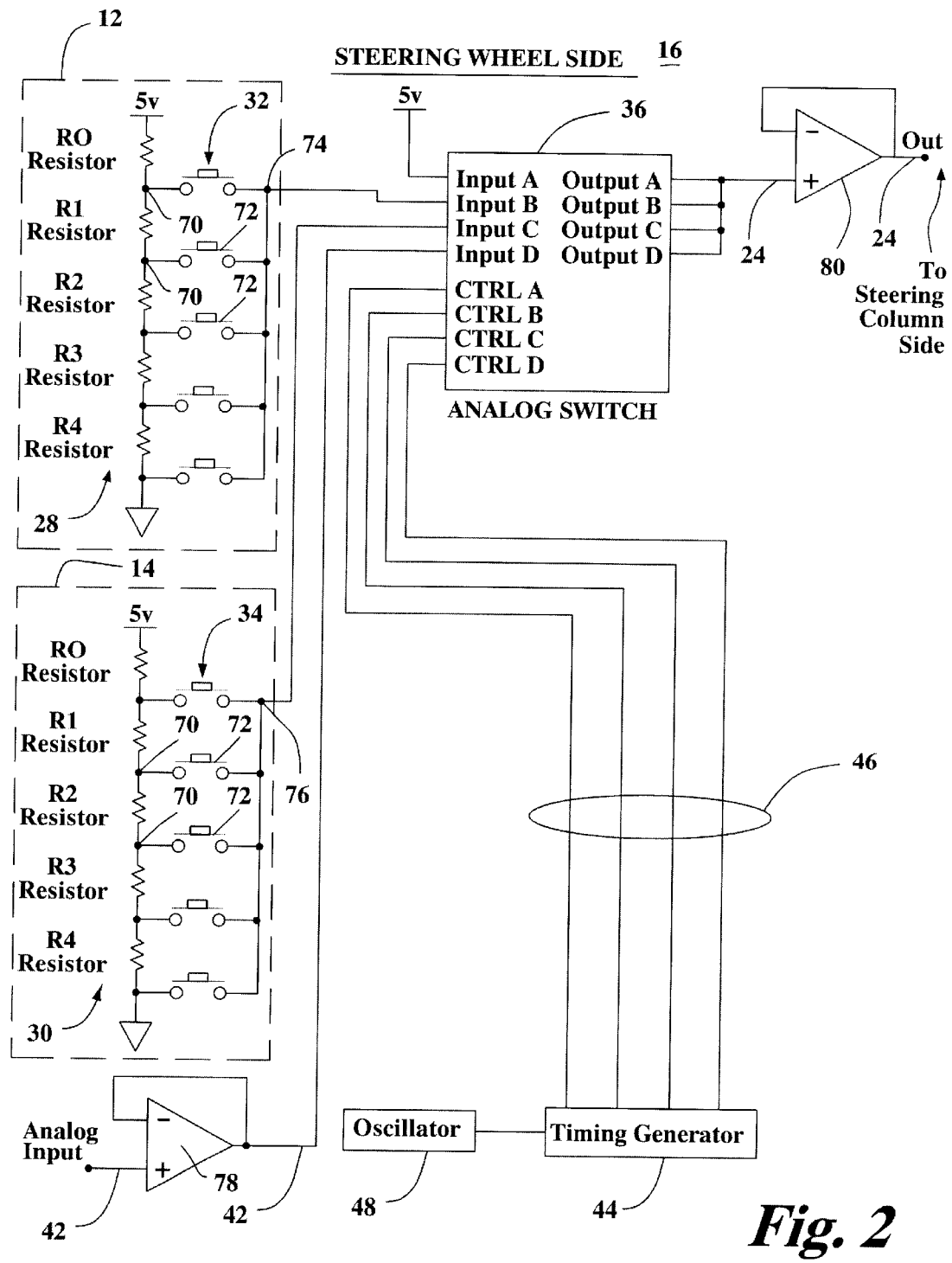
FIG. 2 is a circuit diagram of the steering wheel side of the connection system shown in FIG. 1.

FIG. 2 is a circuit diagram of the steering wheel side 16 of the connection system 10 shown in FIG. 1. The resistor ladders 28,30 and switch ladders 32,34 are shown in more detail in FIG. 2. Resistor ladders 28,30 each include five resistors (R0–R4) connected in series between a five-volt supply and ground. Individual analog switches 72 are connected to each of the nodes 70 between the resistors R0–R4. Opposing ends of the switches 72 are connected to common nodes 74,76. While the embodiment illustrated in FIG. 2 illustrates two input devices 12 and 14, it should be realized that more or less input devices could be incorporated into the present invention. Similarly, more or less individual resistors (R0–R4) and switches 72 can be incorporated into each of the input devices 12,14, depending on the specific requirements of the system. The group of analog switches 72 in each input device 12,14 is used to select a specific input during a given time interval.

Commons nodes 74,76 of the input devices 12,14 are connected to inputs B,C, respectively, of the analog switch 36. First input A of the analog switch 36 is connected to a 5-volt power supply in order to provide a synchronizing pulse for the receiver to stay in synchronization with this modulator. This is done by applying 5 volts directly to one channel of the time division multiplexer so that upon each restart of a sequence through the analog switches a constant 5 volts will be output on the line 24. By doing so the sync pulse detector 50 will receive an identifiable voltage pulse that is higher than any other signal. The sync detector 50 (FIG. 3) of the column side 22 is triggered by a sync pulse which indicates the beginning of a sequence. The analog input 42 is connected to Input D of the analog switch 36. An operational amplifier 78 may also be included on the analog input line 42 to amplify and buffer analog signals being received by the analog switch 36.

The combination of the resistor ladder 28,30 and the switch ladder 32,34 enables each switch 72 to correspond to a different voltage output on common node 74 or 76. Assuming all resistors R0–R4 are equal and connected to a 5-volt power supply, then, for example, each activated switch could result, for example, in outputted voltages of 4, 3, 2, 1, and 0 volts, respectively, at common node 74,76. An output voltage of 5 volts at common node 74,76 would represent a fault. An additional resistor could be added between R4 and ground, so that the last switch would output a voltage around 0.5 volts, and a 0 volt output would signify a short in the system. By simply knowing the values of resistors R0–R4 and the supply voltage, a determination of the output voltage at common node 74 or 76 would enable a receiver to determine if and which switch had been activated. In the preferred embodiment only one switch 72 in an input device 12 or 14 could be activated at a time. If multiple switches can be activated simultaneously, a receiver could easily determine this error by reading a voltage at common node 74 or 76 that does not correspond to one of the predetermined voltages corresponding to each activated switch 72.

Figure 2B:
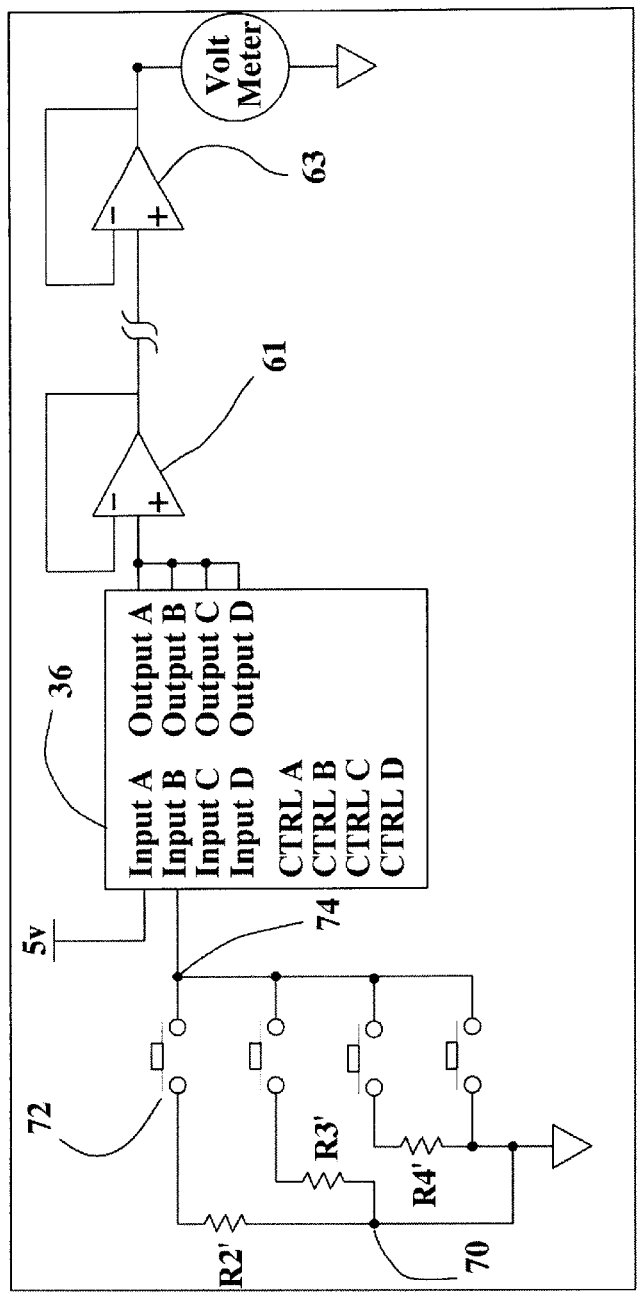
FIG. 2b is a second embodiment of the input device shown in FIG. 2.
Figure 2A:
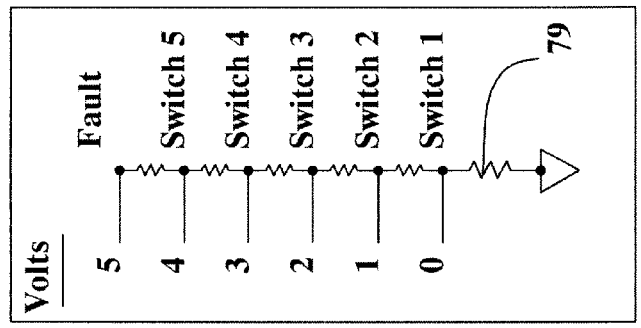
FIG. 2a is a simplified circuit diagram of the input device shown in FIG. 2.

FIG. 2a illustrates a simplified circuit diagram corresponding to the input devices 12 and 14. FIG. 2a illustrates how each switch 1–5 corresponds to an output voltage of 0–4 volts, respectively. A 5-volt output would signify a fault. Also, a resistor 79 could be included between ground and switch 1, thus raising all output voltages. In this manner, a zero output voltage would indicate a short in the system.

Referring back to FIG. 2, the analog switch 36 continuously samples each Input A,B,C,D. Input A is connected to a 5-volt supply. Connecting Input A to 5 volts yields an output voltage during time slot A of 5 volts, which is intended to be higher than any other signal level. This ensures that only during this time period is the sync detector 50 to be in a transitional state. Input B of the analog switch 36 is connected to common node output 74. Input C is connected to common node output 76, and Input D is connected to analog input line 42. All Outputs A,B,C,D of the analog switch 36 are tied together and connected to the single line 24 which is carried through the clockspring 26 on a steering column of an automobile. A unity gain operational amplifier 80 may be included on line 24 to amplify and buffer signals on line 24. However, the operational amplifier 80 may not be required.

Timing generator 44 is connected to control Inputs A,B, C,D of the analog switch 36 via control lines 46. Control lines A,B,C,D select corresponding Input/Output lines A,B, C,D of the analog switch 36. The oscillator 48 clocks the timing generator 44 though each control line A,B,C,D in order to select, one at a time, each of the Input/Output Lines A,B,C,D of the analog switch 36. In this manner, input from the 5-volt supply, input device 74, input device 76, and analog input 42 are each passed through the analog switch 36, one at a time, to single line 24 and through the clockspring 26. The timing generator 44 can be provided using any of several devices, such as a binary counter, a shift register, or a multi-output oscillator.

The order of the input devices 74,76, analog input 42, and 5-volt supply relative to the Inputs A,B,C,D of the analog switch 36 can vary. Similarly, an analog input 42 may be eliminated if desired, and more input devices 12 or 14 may be added. If an analog input 42 is used, there may be a desire to set the analog maximum voltage such that a synchronizing pulse 51 is well above the analog channel maximum. If the analog voltage is able to get to 5 volts, then the sync pulse voltage/magnitude needs to be greater so the sync pulse 51 can be distinguished. This is to guarantee that the sync pulse detector 50 will only trigger at the appropriate time and not during any other portion of the multiplexed analog signal. A circuit for introducing a sync pulse above 5 volts can be utilized for this purpose.

The switching function provided by the analog switch 36 can be performed in a number of ways, and the inventor has shown one example for demonstration. A multiple analog switch multiplexer/demultiplexer in a single integrated circuit can be used in place of the analog switch 36. Also FET circuits, transistor switching means, and even relays or other mechanical apparatuses can work as well.

FIG. 2b illustrates a second embodiment for the input devices 12,14. In this embodiment each resistor R2', R3', and R4' have difference values and have one end tied to ground. Such an embodiment may be used if different resistor values are desired to achieve output voltages that are not separated by equal values.

Figure 3:
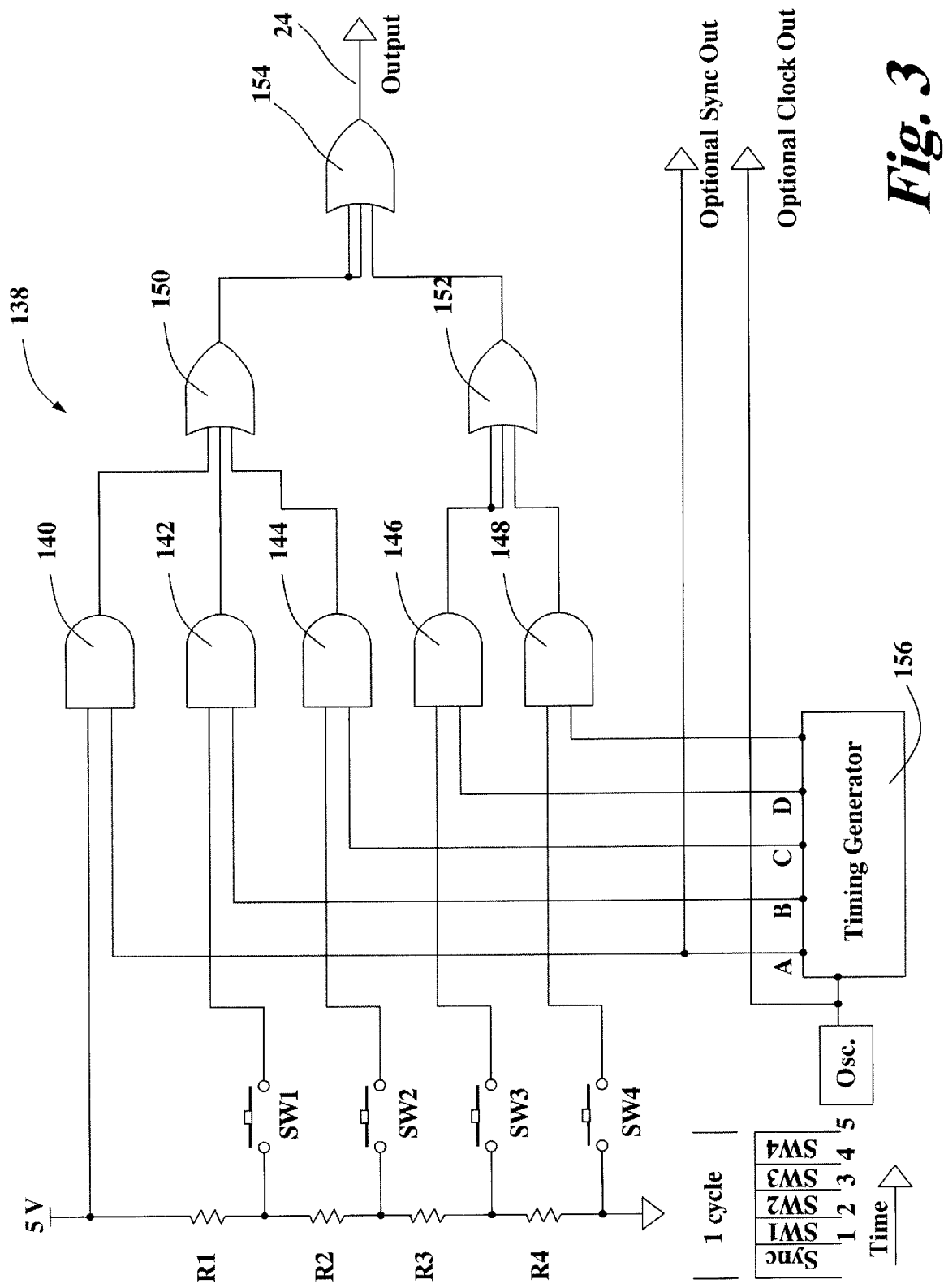
FIG. 3 is a circuit diagram of a third embodiment of the steering wheel side of the connection system shown in FIG. 1.

FIG. 3 illustrates a circuit diagram of a third embodiment of the steering wheel side 16 of the connection system 10 shown in FIG. 1. Instead of using an analog switch 36 as shown in FIG. 2, the third embodiment utilizes an logic array switch 138 comprised of AND gates 140,142,144,146,148 and OR gates 150,152,154. Each output of the timing generator 160 is connected to an input of each AND gate 140,142,144,146,148 of the logic array switch 138. As the timing generator 160 clocks though and enables each output A,B,C,D, the output of each switch (SW1-SW4) is passed through the logic array switch 138 one at a time and onto line 24. Similar to prior configurations, the output signal of each active switch (SW1-SW4) has a unique voltage level.

Figure 4:
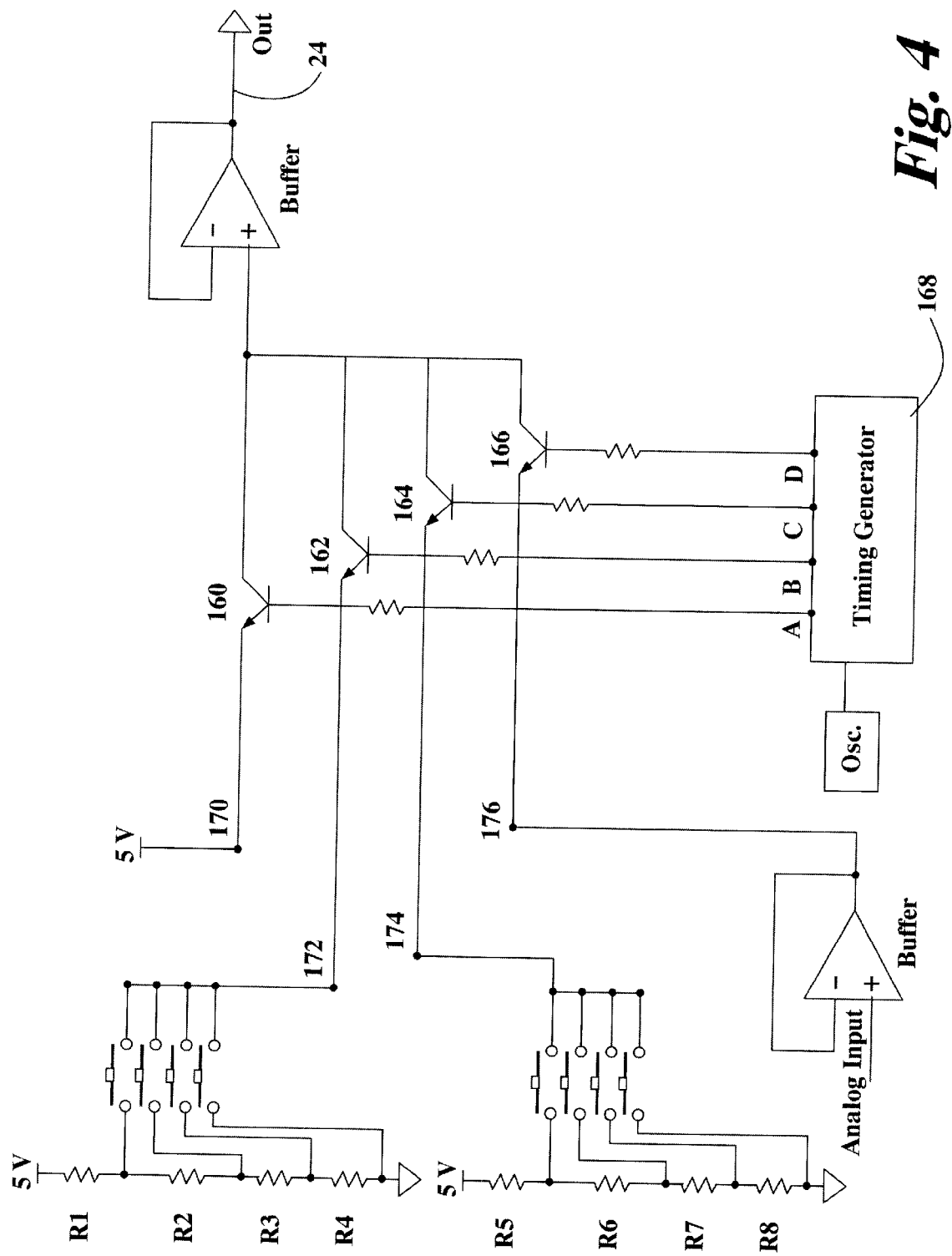
FIG. 4 is a circuit diagram of a fourth embodiment of the steering wheel side of the connection system shown in FIG. 1.

FIG. 4 illustrates a circuit diagram of a fourth embodiment of the steering wheel side 16 of the connection system 10 shown in FIG. 1. Instead of using an analog switch 36 as shown in FIG. 2, the fourth embodiment utilizes transistors 160,162,164,166 having their emitters connected to outputs A,B,C,D of the timing generator 168. As the timing generator 168 clocks though and enables each transistor 160,162, 164,166 via timing generator outputs A,B,C,D, the signals at nodes 170, 172, 174,176 are passed onto line 24 one at a time.

Figure 5:
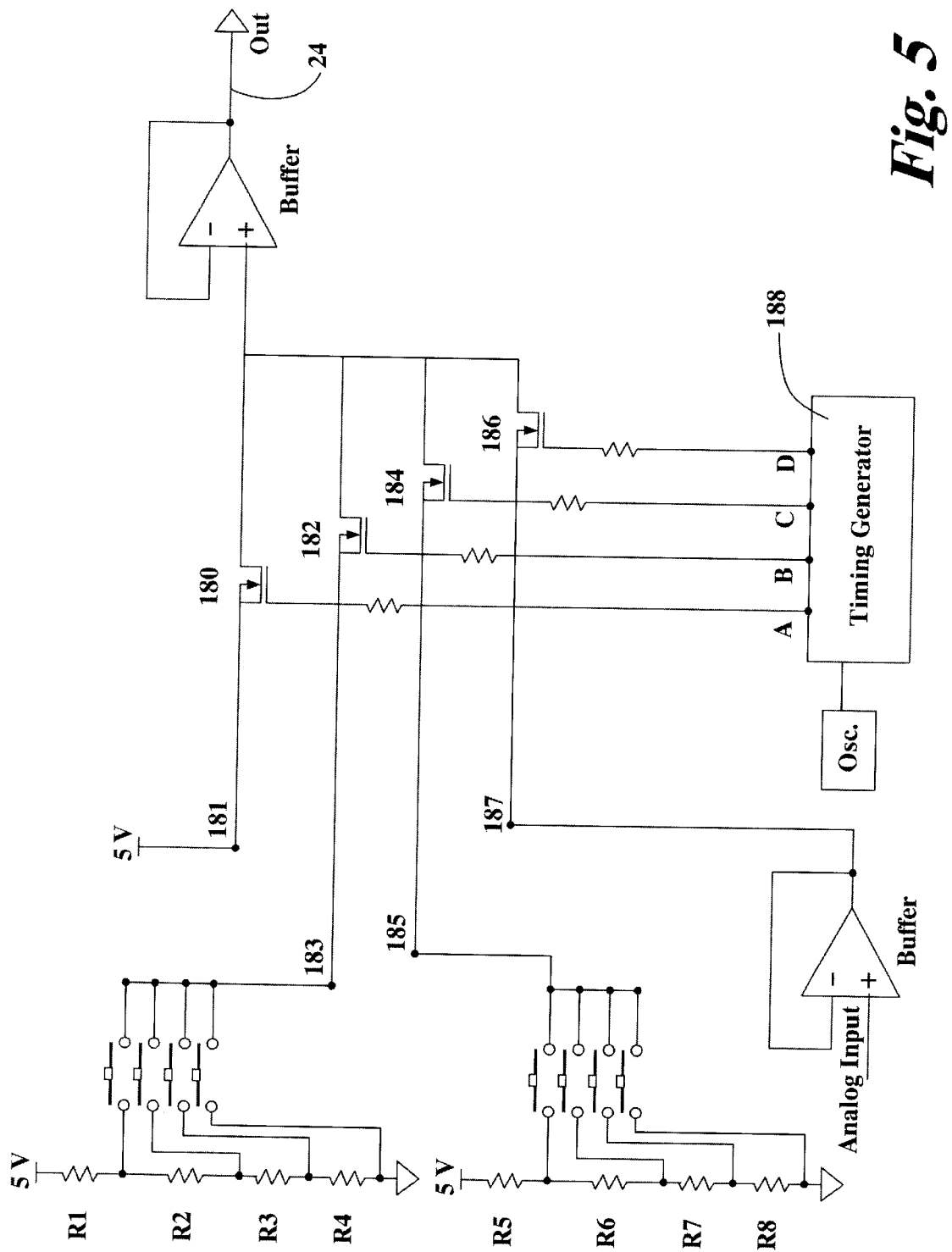
FIG. 5 is a circuit diagram of a fifth embodiment of the steering wheel side of the connection system shown in FIG. 1.

FIG. 5 illustrates a circuit diagram of a fifth embodiment of the steering wheel side 16 of the connection system 10 shown in FIG. 1. Instead of using transistors as shown in FIG. 4, the fifth embodiment utilizes transistors mosfets 180,182,184,186 having their gates connected to outputs A,B,C,D of the timing generator 188. As the timing generator 188 clocks though and enables each mosfet 180,182,184, 186 via timing generator outputs A,B,C,D, the signals at nodes 181, 183,185,187 are passed onto line 24 one at a time.

Figure 6:
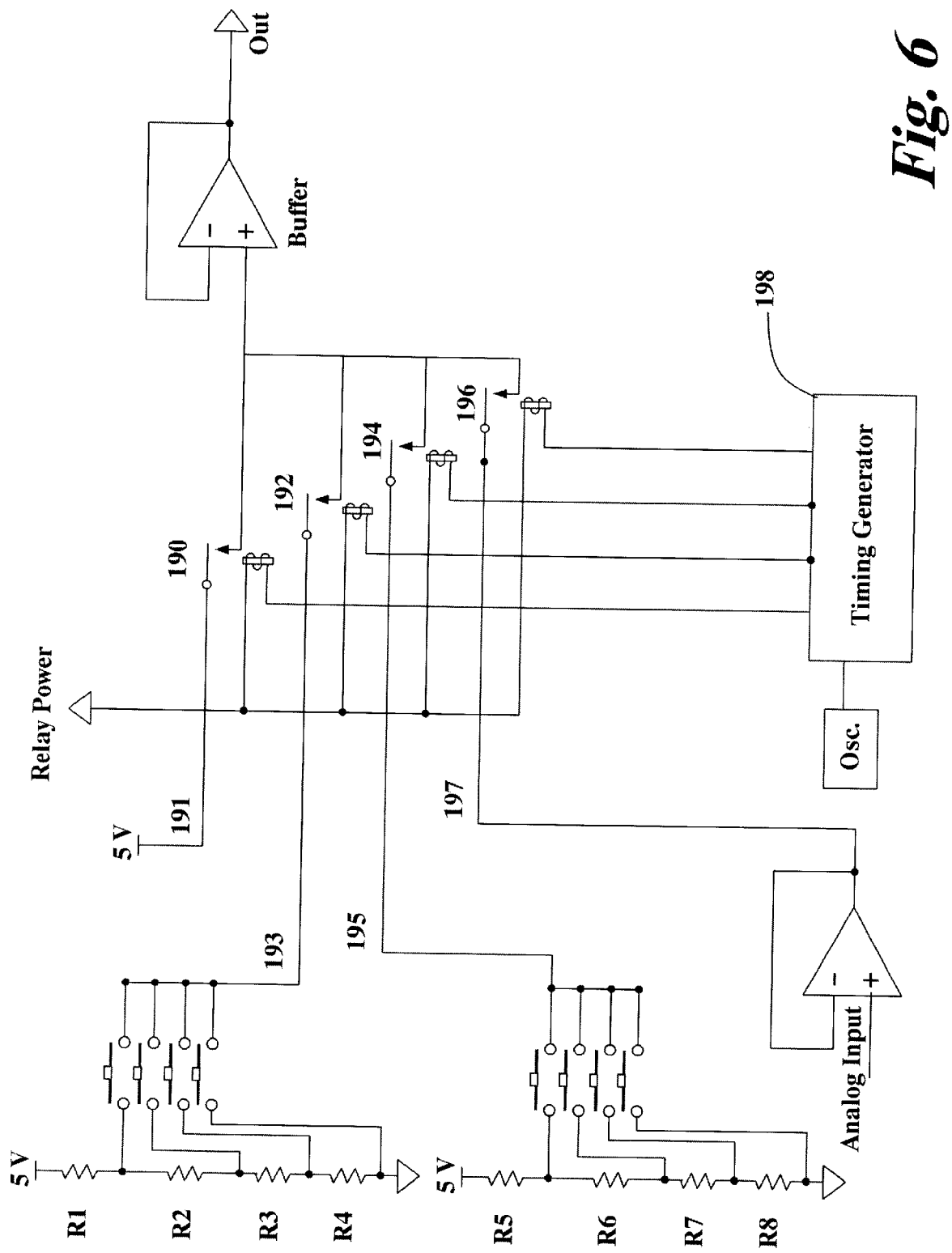
FIG. 6 is a circuit diagram of a sixth embodiment of the steering wheel side of the connection system shown in FIG. 1.

FIG. 6 illustrates a circuit diagram of a sixth embodiment of the steering wheel side 16 of the connection system 10 shown in FIG. 1. Instead of using transistors as shown in FIG. 4, the sixth embodiment utilizes inductor relay switches 190, 192, 194, 196 having their inductor activators connected to outputs A,B,C,D of the timing generator 198. As the timing generator 198 clocks though and enables each inductor relay switches 190,192,194,196 via timing generator outputs A,B,C,D, the signals at nodes 191,193,195,197 are passed onto line 24 one at a time.

Figure 7:
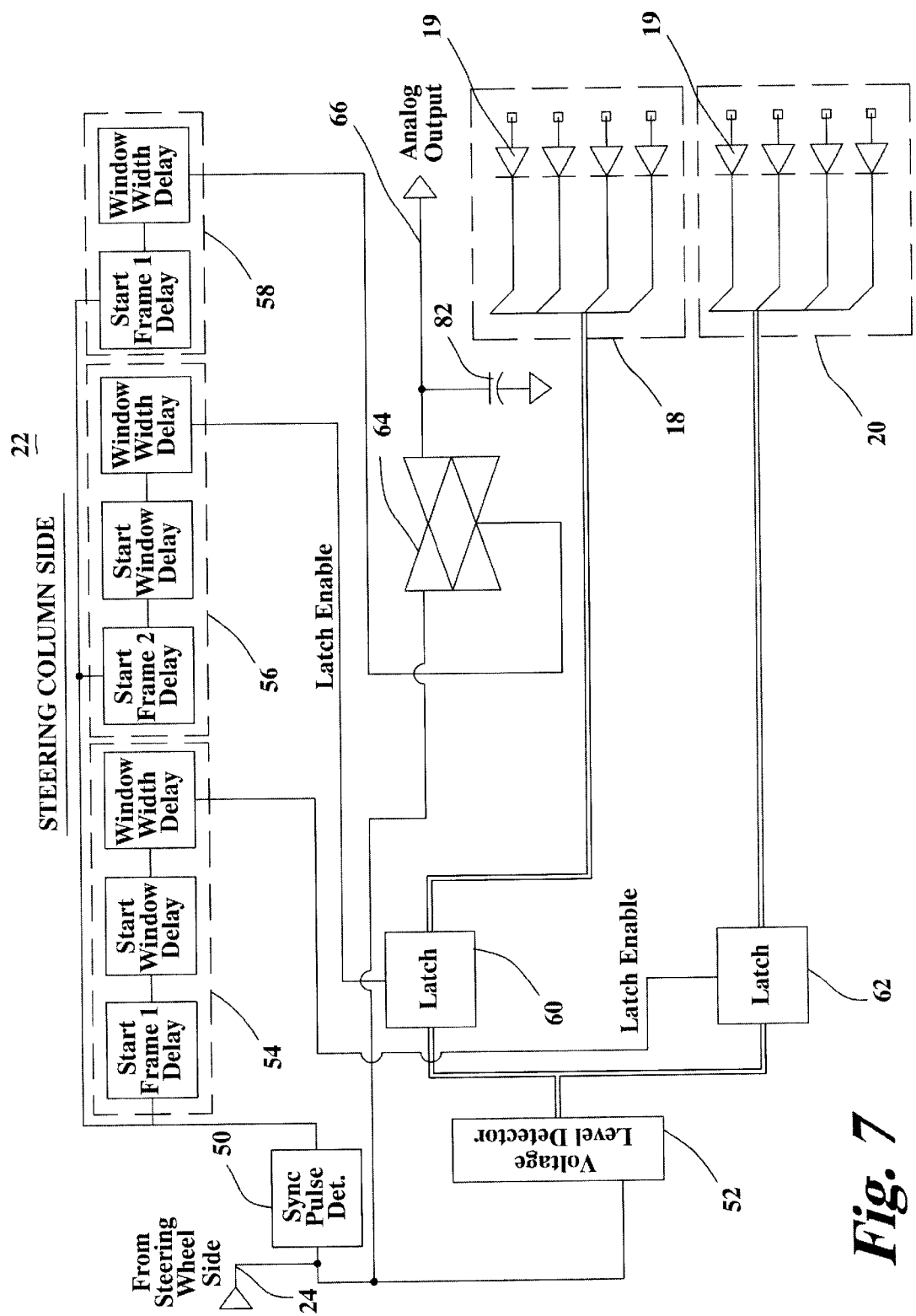
FIG. 7 is a block and circuit diagram of the steering column side of the connection system shown in FIG. 1.
Figure 7A:
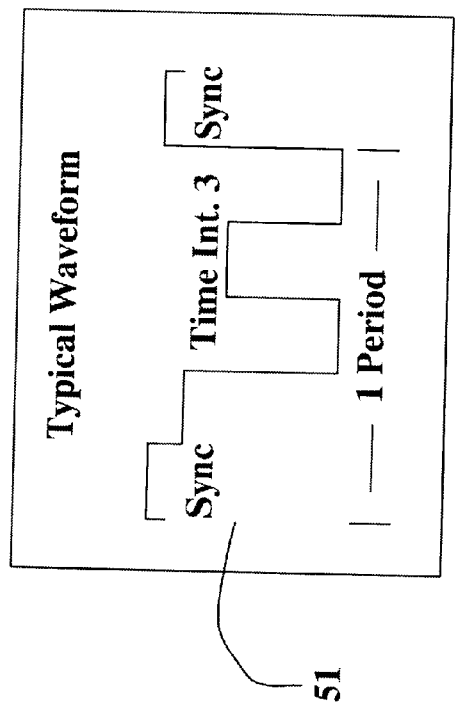
FIG. 7a is timing diagram of the synchronization pulse used in the present invention.

FIG. 7 illustrates a partial block and circuit diagram of the steering column side 22 of the connection system 10. The synchronization pulse detector (sync pulse detector) 50 receives incoming signals on line 24. The sync pulse detector 50 triggers on a sync or marker pulse 51 in a received signal, as shown in FIG. 3a. The sync pulse 51 has an amplitude (voltage) greater than any other portion of the signal, allowing for a simple comparator to be used to extract this key pulse signal. The sync pulse detector 50 outputs a pulse (equal in time to the sync pulse in the multiplexed signal) to the time delay circuits 54,56,58 that generate time windows in which time slots can be sampled. The incoming signal from line 24 is divided into periods upon which the signal will repeat over and over. These periods are divided into a number of separate intervals or slots, which contain the voltage sourced by a particular input analog signal as from lines 38, 40, or 42. The delay circuits 54,56,58 generate a series of pulses that correspond with these time slots, though starting a small segment of time later and ending a small segment of time before the end of the slot. This 'narrowing' of the pulses or windows, makes for needed guard bands, to measure the voltage or view the signal, and provides for inaccuracies in the timing that naturally occurs from circuit component variations. A guard band is the useable space, in this case time, in which data is unknown or uncertain due to variables caused by the component variations and the time required to do the switching. Using guard bands ensures that only the voltage of one of the desired lines 38, 40, or 42 is measured at a time and not corrupted by another signal line that would otherwise overlap into the sample window.

The voltage lever detector 52 outputs a voltage on only one node representative of the lines 38, 40 or 42 activated at any given instant. Output from the voltage level detector 52 is inputted to latches 60,62 which, when open, receive the decoded signal and, upon release of the respective latch, received data will be 'latched' or held until the next period occurs and the process repeats.

Data stored in the latches 60,62 represents input of the input devices 12,14 at a given instant. Output from the latches 60,62 is delivered to a respective module 18,20, although in the illustrated embodiment, LEDs 19 function as output modules 18,20. Line 66 provides analog output which passes though analog switch 64. Capacitor 82 on line 66 stores transmitted analog voltages being outputted on line 66. Upon each period repetition, the analog switch 64 opens and the new, current value, voltage is stored in the capacitor 82. It should be clear at this point that the analog signal is simply sampled once per interval and restored in this sample and hold, similar to the demodulator within an AM radio. The sample rate in this system has an impact upon the bandwidth of the analog signal and must be considered. Constant replacement of the previously held voltage with the new will provide for regeneration of an AC waveform.

The sync pulse detector 50 is preferably a comparator circuit that discriminates received voltage levels that are above a predetermined threshold as determined by the system 10. A synchronization pulse 51 in the received signal is intentionally set at a higher voltage level than the allowed voltage level of transmitted data. A comparator 84 (FIG. 8a) within the sync pulse detector 50 registers when the high voltage level of the sync pulse 51 is present, which indicates the start of a new cycle. Of course, the sync pulse 51 can be placed elsewhere in the data stream rather than at the start of a cycle.

Figure 8A:
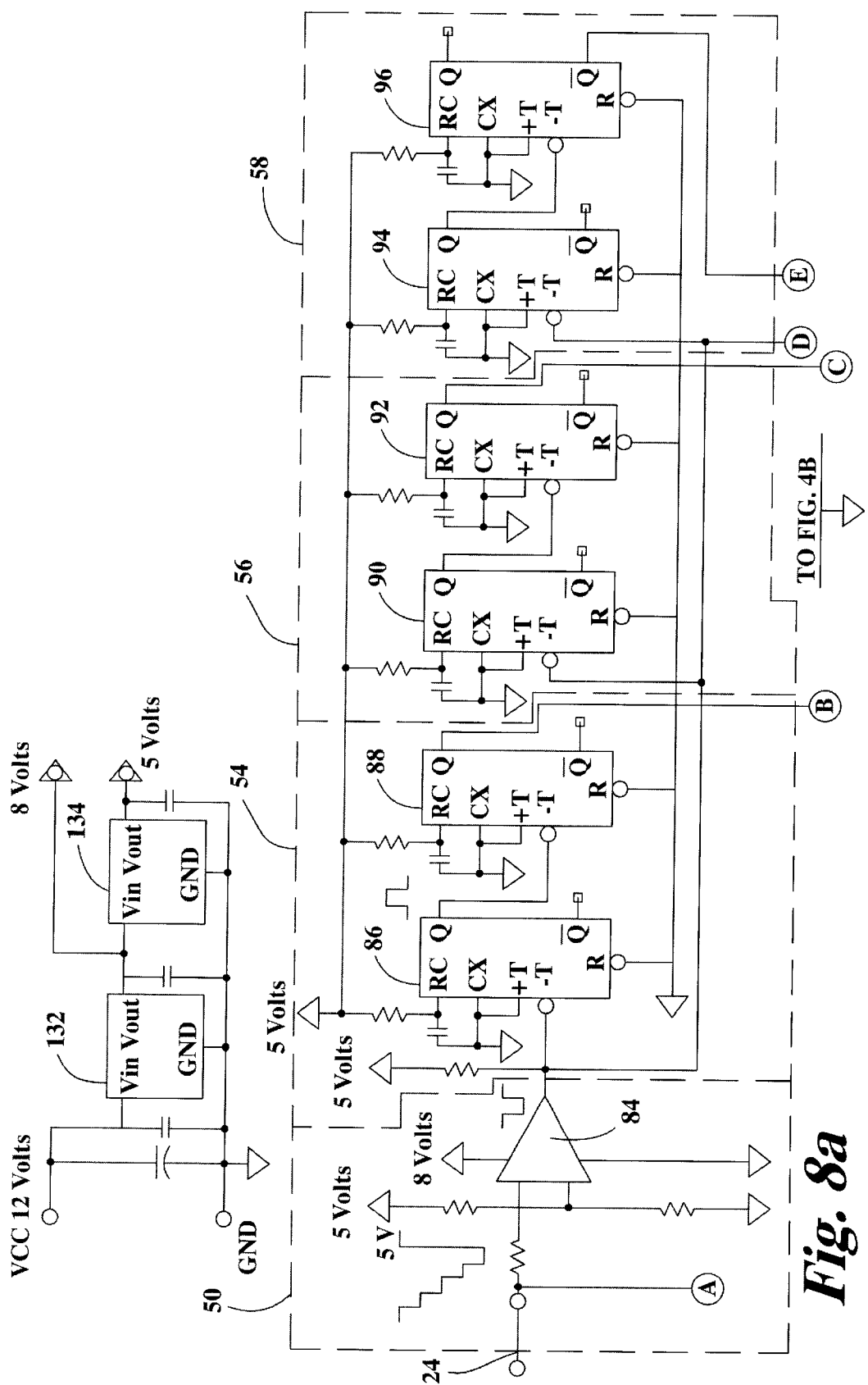
FIGS. 8b and 8b are a more detailed circuit diagram of the steering column side of the present invention shown in FIG. 7.
Figure 8B:
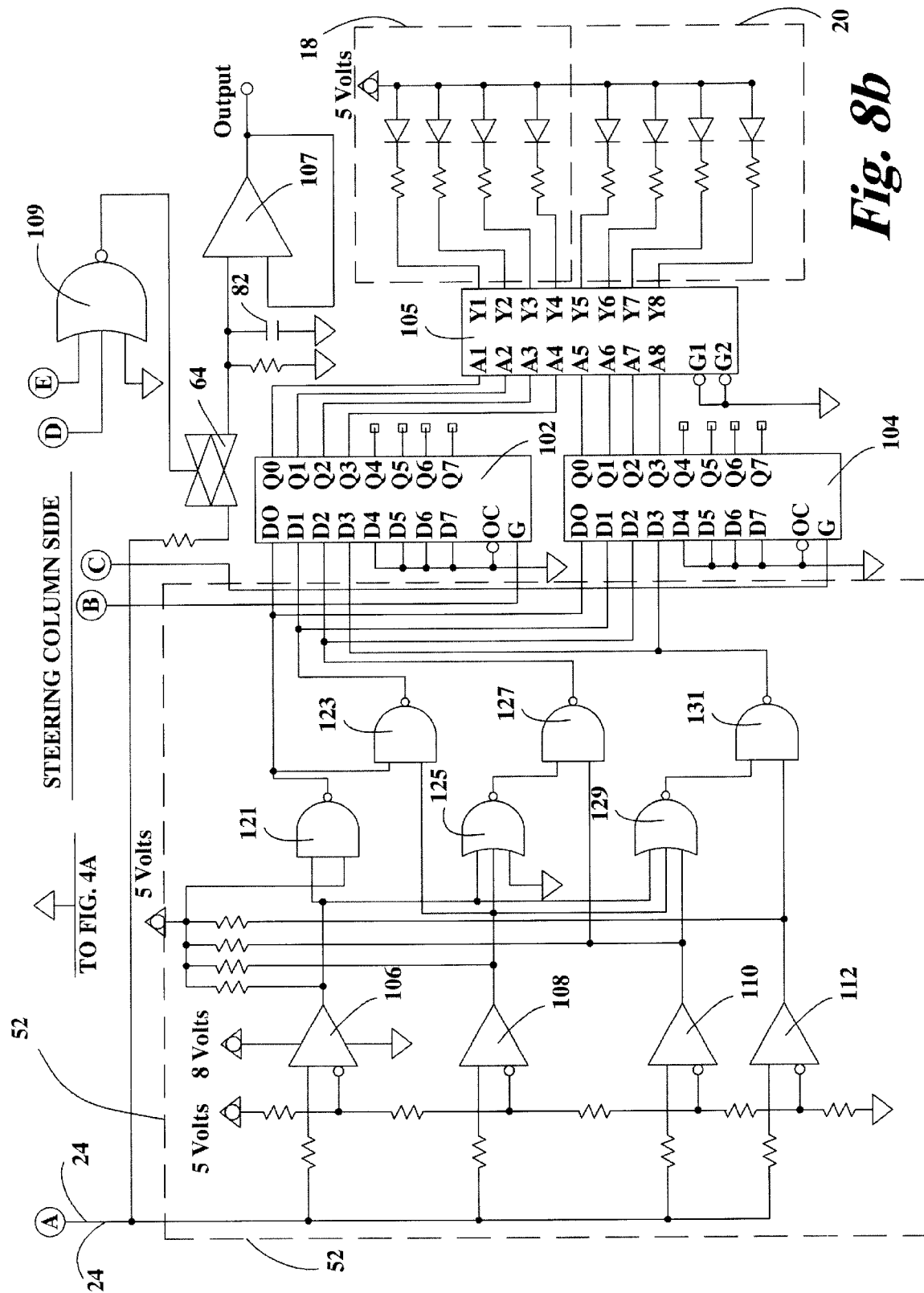

Referring to FIGS. 8a and 8b, line 24 is shown leading to the sync pulse detector 50 from the steering wheel side 16 via line 24. In response to a sync pulse 51, the sync pulse detector 50 outputs a pulse to the time delay circuits 54,56, 58 that generate time windows in which time slots can be sampled.

This sync detector comparator 84 output is applied to time delays 54, 56, 58, comprising a separate monostable multivibrator (MMV) or one shot circuit each. The time windows are delayed a small amount extra from the transition of the given group slot.

A second MMV 88,92,96 is connected to the output of each first MMV 86,90,94 to time out the slot width ensuring the end of the slot before the end of the window could possibly occur. The sync pulse 51 is first received by a MMV 86 within the delay circuit 54. The MMV 86 or a one shot produces a delay from the end of the sync pulse 51 of a time sufficient to ensure the signal has settled to the new level for the given time slot. At the point of timeout of this MMV 86, latch 102 is enabled and a second MMV 88 generates a time window for the latch 102 whereupon the end of this second MMV 88 cycle, the latch 102 is disabled, or locked. The data input for the latch 102 comes from the voltage level detector 52, which at the given time is decoding the first data segment of the received signal. Thus locked data in the latch 102 will reflect the switch status of the first input device switch 12.

Next there is a second group of the above functions in delay circuit 56, corresponding to input device 14, different only in that the delay of the first MMV 90 is longer to allow the signal to stabilize in the second data segment. The second latch 104 will hold the data from the second switch group.

Next there is a third group of the above functions in delay circuit 58, corresponding to the analog input line 42, different only in that the delay of the first MMV 94 is longer to allow the signal to stabilize in the third data segment. The third latch composed of analog switch 64 and capacitor 82, will hold the data from the third switch group, or in this case, the analog data line 42. In the example this third group has been replaced by an analog signal. Therefore there is an analog switch 64 coupled to a capacitor 82 (FIGS. 7 and 8b) to form an analog sample and hold for this analog signal. If the output from the analog switch 64 does not have a high impedance, a buffer amplifier 107 will be necessary to protect the voltage level from dropping off, or sagging, during the delay between samples. The frequency response of the input signal necessary to transmit will become the determining factor of the transmitter oscillator frequency necessary for this.

All the first MMV's 86, 90, 94 are going to have some tolerance in their timing, as well as the oscillator 48. For this reason there needs to be a significant guardband in the timing to guarantee that there will be no improper data latched that is intended for a different segment.

As with many system designs there are several ways in which to build this receiver. The method used here was only for its simplicity in understanding the function. Another way of accomplishing this task would be to change the decoder and latches and use the analog latch/sample and hold then feed the stored value into a decoder, or possibly into an A/D converter which will yield a digital output for additional processing.

Still another variation may replace the series of MMVs with an oscillator and digital counter, which will generate the sample pulses for latching. This would resemble that used for the transmitter. A shift register clocking a pulse through would also do the job.

The level detector 52 includes four comparators 106, 108, 110 and 112, that receive input signals to their noninverting terminals from signal line 24. A resistor ladder is connected progressively to the inverting terminals of comparators 106, 108, 110 and 112. The comparators 106, 108, 110 and 112 each provide a high output any time the input exceeds its respective ladder voltage thereby indicating which voltage band the input is in.

Since these comparators are turned on in sequence and the lower level ones do not turn off at higher levels, there is a need for some logic components 121, 123, 125, 127, 129, 131 to be added to make this happen. This way as each consecutive comparator turns on the previous one, (lower level) is disabled. So now only one output is active at any given time.

Since the comparator stack output is combined with the input signal, the "decoded" output from the logic needs to be held as each consecutive window occurs. Comparators 106, 108, 110, 112 comprise the comparator stack that share the input signal, whereupon items the logic components 121, 123, 125, 127, 129, 131 sort the comparator findings and input to the 102, 104 latches. Latches 102 and 104 share the decoder output, but each is opened and latched by separate outputs from the time delay circuits.

Therefore, present on each latch output 102 and 104 presents a group of four signals corresponding to the two sets of four switches on the wheel side. Digital driver 104 turns on the respective outputs, which in this case, are LED indicators 19 for each latched data signal.

Output of the analog switch 64 is can be fed through a buffer 107, which serves as an analog output channel for demonstration. NOR gate 109 is added to turn off the analog switch 64 upon the start of another sync pulse in the event the MMV 94 triggers MMV 96 in this case.

It is to be understood that the foregoing description is merely a disclosure of particular embodiments and is no way intended to limit the scope of the invention. Several possible alterations and modifications will be apparent to those skilled in the art.

I claim as my invention:

1. A connection system for communicating multiple signals between a steering wheel and a steering column of a vehicle over a single wire, comprising:

a signal line for providing a single line connection between a steering wheel side and a steering column side in a vehicle, said signal line having a steering wheel end and a steering column end;

a switching device comprising multiple inputs, a switch enable corresponding to each input, and an output connected to the steering wheel end of the signal line;

a first input device having a plurality of switches connected to a first input of the switching device, wherein activation of each of the plurality of switches outputs a unique predetermined output voltage, corresponding to each of the plurality of switches, to the first input of the switching device;

a second input device having a plurality of switches connected to a second input of the switching device, wherein activation of each of the plurality of switches outputs a unique predetermined output voltage, corresponding to each of the plurality of switches, to the second input of the switching device; and a timing generator connected to the switching device having multiple outputs that are toggled one at a time, each connected to a separate switch enable of the switching device, wherein the timing generator activates each switch of the switching device one at a time to allow the output from each of the plurality of switches to pass to the steering wheel end of the signal line.

2. The connection system of claim 1, further comprising:

a synchronization pulse detector having an input connected to the steering column end of the signal line and an output, said synchronization pulse detector generating a time pulse in response to a syncronization pulse;

a first time delay circuit connected to the output of the synchronization pulse detector;

a second time delay circuit connected to the output of the synchronization pulse detector;

a voltage level detector connected to the steering column end of the wire line;

a first latch having an input connected to an output of the voltage level detector and a latch enable connected to the output of the first time delay circuit;

a second latch having an input connected to the output of the voltage level detector and a latch enable connected to the output of the second time delay circuit;

a first switch indicator connected to an output of the first latch; and a second switch indicator connected to an output of the second latch.

3. The connection system of claim 2, further comprising:

an analog line connected to a third input of the switching device;

a third time delay circuit connected to the output of the syncronization pulse detector; and an analog switch having an input connected to the steering column end of the signal line and an enable connected to an output of the third time delay circuit.

4. The connection system of claim 1, further comprising:

an oscillator connected to the timing generator.

5. The connection system of claim 1, wherein the switching device is an analog switch.

6. The connection system of claim 1, wherein the switching device comprises a plurality of transistors.

7. The connection system of claim 1, wherein the plurality of transistors are NPN transistors.

8. The connection system of claim 1, wherein the switching device comprises a plurality of MOSFETs.

9. The connection system of claim 1, wherein the switching device comprises a plurality of inductor switch relays.

10. The connection system of claim 1, said switching device further comprising a fourth input connected to a voltage source, wherein the fourth input of the switching device provides a synchronization pulse to the synchronization pulse detector when the timing generator toggles the switch enable corresponding to the fourth switch.

11. The connection system of claim 1, wherein the first input device includes a plurality of resistors connected in series, and a first node of each of the plurality of switches of the first input device is connected to a different node between each of the resistors, thereby assigning a unique output voltage level to each switch.

12. The connection system of claim 11, wherein a second node of each of switches in the plurality of switches of the first input device are connected to a common node.

13. The connection system of claim 1, said first input device including a resistor connected between a first node of each switch and ground, and each resistor has a different resistance, thereby assigning a unique output voltage level to each switch.

14. The connection system of claim 5, wherein all outputs of the analog switch are connected together.

15. The connection system of claim 3, further comprising a capacitor connected between the output of the analog switch and ground.

16. The connection system of claim 2, wherein the synchronization pulse detector includes a comparator.

17. The connection system of claim 2, wherein the first time delay circuit includes a monostable multivibrator (MMV).

18. The connection system of claim 1, further comprising:

a ribbon cable housing a portion of the signal wire.

* * * * *